United States Patent
Zhang

(10) Patent No.: US 10,727,918 B2
(45) Date of Patent: *Jul. 28, 2020

(54) INTERFERENCE AVOIDANCE FOR BEAMFORMING TRANSMISSIONS IN WIRELESS COMMUNICATION DEVICES AND SYSTEMS

(71) Applicant: Marvell World Trade Ltd., St. Michael (BB)

(72) Inventor: Hongyuan Zhang, Fremont, CA (US)

(73) Assignee: Marvell Asia Pte., Ltd., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 16/166,784

(22) Filed: Oct. 22, 2018

(65) Prior Publication Data

US 2019/0058514 A1    Feb. 21, 2019

Related U.S. Application Data

(63) Continuation of application No. 15/090,550, filed on Apr. 4, 2016, now Pat. No. 10,110,289, which is a
(Continued)

(51) Int. Cl.
*H04B 7/06* (2006.01)
*H04W 72/08* (2009.01)
(Continued)

(52) U.S. Cl.
CPC ......... *H04B 7/0617* (2013.01); *H04B 7/0456* (2013.01); *H04B 7/0619* (2013.01);
(Continued)

(58) Field of Classification Search
None
See application file for complete search history.

(56) References Cited

U.S. PATENT DOCUMENTS 7,804,800 B2    9/2010  Li et al.
8,229,017 B1 *  7/2012  Lee ............. H04B 7/0665
                                            342/432
(Continued)

FOREIGN PATENT DOCUMENTS

CN       1902874 A      1/2007
JP    2005347948 A     12/2005
(Continued)

OTHER PUBLICATIONS

IEEE Standards, IEEE Std 802.11B-1999/Cor Jan. 2001 (Corrigendum to IEEE std. 802.11b-1999), IEEE Computer Society, Nov. 7, 2001, 23 pages.
(Continued)

*Primary Examiner* — Eunsook Choi

(57) ABSTRACT

A first wireless communication device includes transceiver circuitry to access data corresponding to a beamforming transmission, transmit, from the first wireless communication device to at least one second wireless communication device, a first sounding packet, and receive, from the at least one second wireless communication device, at least one second sounding packet. The second sounding packet includes channel feedback determined at the at least one second wireless communication device. Processor circuitry is to determine a steering matrix based on the channel feedback. The steering matrix is configured to at least one of reduce and avoid interference caused at the at least one second wireless communication device by transmissions from the first wireless communication device. The transceiver circuitry is further to perform the beamforming transmission to at least one third wireless communication device in accordance with the data corresponding to the beamforming transmission and the steering matrix.

18 Claims, 9 Drawing Sheets

Related U.S. Application Data continuation of application No. 14/340,492, filed on Jul. 24, 2014, now Pat. No. 9,306,645.

(60) Provisional application No. 61/859,065, filed on Jul. 26, 2013.

(51) Int. Cl.
*H04B 7/0456* (2017.01)
*H04L 25/03* (2006.01)
*H04L 25/02* (2006.01)
*H04L 5/00* (2006.01)

(52) U.S. Cl.
CPC ......... *H04B 7/0621* (2013.01); *H04B 7/0626* (2013.01); *H04B 7/0632* (2013.01); *H04L 5/0048* (2013.01); *H04L 25/0228* (2013.01); *H04L 25/0391* (2013.01); *H04L 25/03904* (2013.01); *H04W 72/082* (2013.01)

(56) References Cited

U.S. PATENT DOCUMENTS

| | | | |
|---|---|---|---|
| 8,243,749 B2 * | 8/2012 | Basson | H04L 1/0026 370/252 |
| 8,270,909 B2 | 9/2012 | Zhang et al. | |
| 8,467,345 B2 | 6/2013 | Abraham et al. | |
| 8,942,214 B2 * | 1/2015 | Lee | H04B 7/0452 370/338 |
| 2004/0095907 A1 | 5/2004 | Agee et al. | |
| 2005/0047384 A1 | 3/2005 | Wax et al. | |
| 2006/0153227 A1 | 7/2006 | Hwang et al. | |
| 2007/0153754 A1 | 7/2007 | Shapira et al. | |
| 2007/0211620 A1 | 9/2007 | McBeath et al. | |
| 2007/0230373 A1 | 10/2007 | Li et al. | |
| 2007/0298742 A1 | 12/2007 | Ketchum et al. | |
| 2008/0212538 A1 | 9/2008 | Molisch | |
| 2009/0093222 A1 | 4/2009 | Sarkar | |
| 2009/0239472 A1 | 9/2009 | Chae et al. | |
| 2009/0252091 A1 | 10/2009 | Tang et al. | |
| 2010/0195586 A1 | 8/2010 | Choi et al. | |
| 2010/0248635 A1 * | 9/2010 | Zhang | H04B 7/0413 455/63.1 |
| 2010/0260138 A1 | 10/2010 | Liu et al. | |
| 2010/0323711 A1 | 12/2010 | Damnjanovic et al. | |
| 2011/0038332 A1 | 2/2011 | Liu et al. | |
| 2011/0310827 A1 | 12/2011 | Srinivasa et al. | |
| 2012/0257574 A1 * | 10/2012 | Seok | H04W 72/082 370/328 |
| 2012/0314791 A1 | 12/2012 | Zhang et al. | |
| 2012/0315938 A1 | 12/2012 | Van Nee et al. | |
| 2014/0079010 A1 * | 3/2014 | Li | H04L 1/1809 370/329 |
| 2014/0098681 A1 | 4/2014 | Stager et al. | |
| 2014/0362944 A1 | 12/2014 | Zhang et al. | |
| 2015/0117324 A1 | 4/2015 | Ponnuswamy | |

FOREIGN PATENT DOCUMENTS

| | | |
|---|---|---|
| JP | 2007318730 A | 12/2007 |
| JP | 2008500765 A | 1/2008 |
| JP | 2008544653 A | 12/2008 |
| WO | 05004500 A2 | 1/2005 |
| WO | 2007117949 A1 | 10/2007 |
| WO | 2008002972 A2 | 1/2008 |
| WO | 2008083399 A2 | 7/2008 |
| WO | 2009009199 A2 | 1/2009 |
| WO | 2009027931 A2 | 3/2009 |
| WO | 2010022255 A1 | 2/2010 |

OTHER PUBLICATIONS

Gunnam et al., "Multi-Rate Layered Decoder Architecture for Block LDPC codes of the IEEE 802.11n Wireless Standard", IEEE 1-4244-0921-7/07, pp. 1645-1648, 2007.

Supplement to IEEE Standard for Information Technology, IEEE P802.11g/D8.2, Apr. 2003, 69 pages.

IEEE Standards Draft, IEEE P802.11ac/D2.1, Mar. 2012, 363 pages.

Supplement to IEEE Standard for Information technology, IEEE Std 802.11 a-1999, 1999, 91 pages.

"Part II: Wireless LAN Medium Access Control (MAC) and Physical Layer (PHY) specifications: Higher-Speed Physical Layer Extension in the 2.4 GHz Band," IEEE Std. 802.11b (1999), 96 pages.

"TGn Sync Proposal Technical Specification," IEEE Std. 802.11n (2005), 131 pages.

Information technology—Telecommunications and information exchange between systems—Local and metropolitan 8 etworks—specific requirements. Part 11: Wireless LAN Medium Access Control (MAC) and Physical Layer (PHY) Specifications, IEEE Std. 802.11n, Nov. 29, 2009, 535 pages.

Zhang et al., "Exploiting Multi-Antennas for Opportunistic Spectrum Sharing in Cognitive Radio Networks," IEEE The 98th Annual IEEE International Symposium on Personal, Indoor and Mobile Radio Communications (PIMRC), 2007, 5 pages.

IEEE P802.11nTM/02.00, "Part 11: Wireless LAN Medium Access Control (MAC) and Physical Layer (PHY) Specifications," Feb. 2007, pp. 1-498.

Sophie Vrzic et al., Proposal for IEEE 802.16m DL MIMO Schemes, IEEE C802.16m-08/342r1, May 12, 2008, pp. 1-17.

Stephens, IEEE P802.11-05/1095r5, "Joint Proposal: High throughput extension to the 802.11 Standard: MAC", Jan. 13, 2006, pp. 1-104.

Agere Systems, Inc., et al., TGn Sync: An IEEE 802.11n Protocol Standard Proposal Alliance, PHY Overview, IEEE, Jun. 2004, pp. 1, 18-22.

Bernard Eozenou, Authorized Officer, Notification of Transmittal of the International Search Report and the Written Opinion of the International Searching Authority, International Application No. PCT/182014/001384, dated Nov. 27, 9 pages.

U.S. Appl. No. 15/090,550, filed Apr. 4, 2016.
U.S. Appl. No. 14/340,492, filed Jul. 24, 2014.

* cited by examiner

INTERFERENCE AVOIDANCE FOR BEAMFORMING TRANSMISSIONS IN WIRELESS COMMUNICATION DEVICES AND SYSTEMS

CROSS-REFERENCE TO RELATED APPLICATIONS

The present disclosure is a continuation Application of U.S. patent application Ser. No. 15/090,550, filed on Apr. 4, 2016, which is a continuation Application of U.S. patent application Ser. No. 14/340,492 (now U.S. Pat. No. 9,306,645), filed on Jul. 24, 2014, which claims the benefit of U.S. Provisional Application No. 61/859,065, filed on Jul. 26, 2013. The entire disclosures of the applications referenced above are incorporated herein by reference.

BACKGROUND

Wireless Local Area Networks (WLANs) include multiple wireless communication devices that communicate over one or more wireless channels. When operating in an infrastructure mode, a wireless communication device called an access point (AP) provides connectivity with a network such as the Internet to other wireless communication devices, e.g., client stations or access terminals (AT). Various examples of wireless communication devices include mobile phones, smart phones, wireless routers, wireless hubs. In some cases, wireless communication electronics are integrated with data processing equipment such as laptops, personal digital assistants, and computers.

Wireless networks such as WLANs can use one or more wireless communication technologies such as orthogonal frequency division multiplexing (OFDM). In an OFDM based wireless communication system, a data stream is split into multiple data substreams. Such data substreams are sent over different OFDM subcarriers, which can be referred to as tones or frequency tones. Some wireless networks use a single-in-single-out (SISO) communication approach, where each wireless communication device uses a single antenna. Other wireless networks use a multiple-in-multiple-out (MIMO) communication approach, where a wireless communication device uses multiple transmit antennas and multiple receive antennas. WLANs such as those defined in the Institute of Electrical and Electronics Engineers (IEEE) wireless communications standards, e.g., IEEE 802.11a, IEEE 802.11n, IEEE 802.11ac, can use OFDM to transmit and receive signals. Moreover, WLANs, such as ones based on the IEEE 802.11n or IEEE 802.11ac standards, can use OFDM and MIMO.

SUMMARY

The present disclosure includes systems and techniques for interference avoidance beamforming transmissions. According to an aspect of the described systems and techniques, a method for interference avoidance beamforming transmissions includes accessing, at a first device, data for transmission to a second device; performing, at the first device, a channel sounding process with a third device to obtain channel feedback regarding a wireless channel between the first device and the third device; determining a steering matrix based on the channel feedback to reduce interference leakage received by the third device during a beamforming transmission from the first device to the second device; and performing, at the first device, the beamforming transmission to the second device based on the data and the steering matrix.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Particular configurations of the technology described in this disclosure can be implemented so as to realize one or more of the following potential advantages. During a beamforming transmission to an intended device, a described technique can reduce an interference signal associated with the beamforming transmission that is experienced by an impacted device. A described technique can minimize interference between overlapping basic service sets by allowing a sounding process between two or more basic service sets to take place. A described technique can increase spectrum efficiency, wireless network density, or both.

Details of one or more implementations are set forth in the accompanying drawings and the description below. Other features and advantages may be apparent from the description and drawings, and from the claims.

BRIEF DESCRIPTION OF DRAWINGS

Like reference symbols in the various drawings indicate like elements.

DESCRIPTION

A wireless network such as a WLAN can select from two or more predetermined frequency bands an operational frequency band for use in its Basic Service Set (BSS). Different networks can use different frequency bands to minimize interference. However, densely deployed wireless networks may experience Co-Channel Interference (CCI) from Overlapping Basic Service Sets (OBSS). For example, in the 2.4 GHz band for IEEE 802.11, there are only three 20 MHz channels, so frequency reuse may be very low which can result in OBSS collisions, e.g., where two basic service sets have to share the same frequency band.

When an OBSS collision happens, interference and performance degradation may occur and can have an impact on unicast packets (e.g., data frames) and broadcast packets (e.g. management frames, control frames). For a unicast packet, an OBSS collision can trigger a Clear Channel Assessment (CCA) and possible physical (PHY) layer decoding. Here, packet processing may cease at the medium access control (MAC) layer when a MAC address mismatch happens, however, CCA can continue to the end of the packet, hence packet transmission is blocked. For a broadcast packet, such as a management frame, an OBSS collision can result in the MAC layer to continue processing the management frame till the end of the packet, setting a long network allocation vector (NAV) that blocks its own transmissions.

While a wireless network may use transmission beamforming (TxBF) to steer signals within a BSS, interference may result with another BSS or the same BSS. This disclosure proposes interference avoidance transmission beamforming (IA-TxBF) in which transmission beamforming is performed with an intended device while avoiding interference leakage to other devices, which could be in the same BSS or a different, overlapping BSS.

Figure 1:
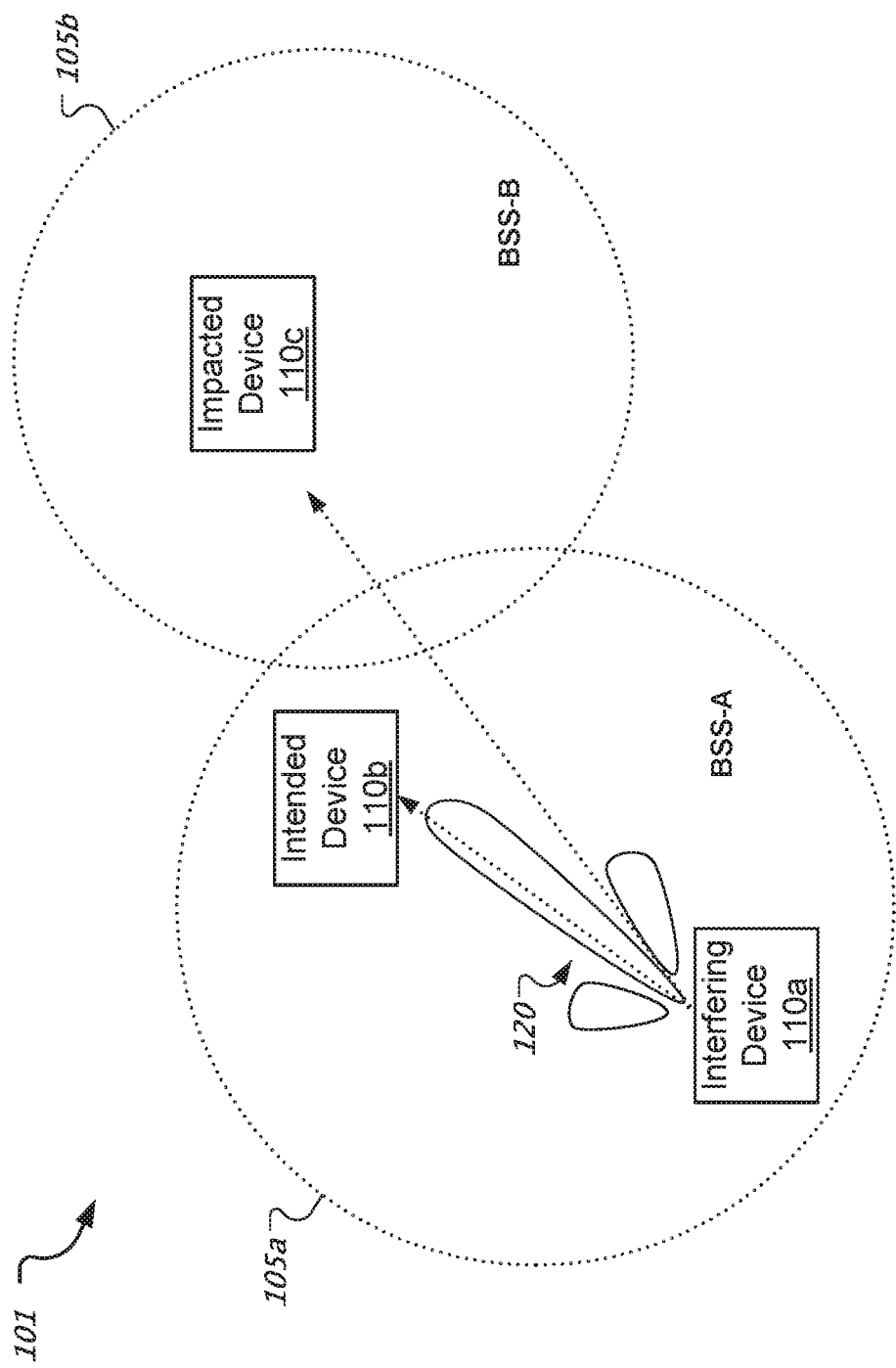
FIG. 1 shows an example of interference between different wireless local area networks during a nominal beamforming transmission.

FIG. 1 shows an example of interference between different wireless local area networks during a nominal beamforming transmission. Devices 110a-c can communicate via a wireless channel within an operating environment 101. The operating environment 101 can include devices 110a-b associated with BSS-A 105a and one or more devices 110c associated with a BSS-B 105b. In this example, BSS-A 105a and BSS-B 105b are forced to operate in the same frequency band. The "interfering" device 110a performs a nominal beamforming transmission 120 to an "intended" device 110b using two or more antennas. Unfortunately, the nominal beamforming transmission 120 can cause interference to other devices such as an "impacted" device 110c, which degrades the performance of the impacted device 110c. However, by using an interference avoidance procedure described herein, the nominal beamforming transmission 120 is replaced by an interference avoidance (IA) beamforming transmission that is steered to reduce interference to the impacted device 110c by directing most of its energy towards the intended device 110b and away from the impacted device 110c.

Figure 2:
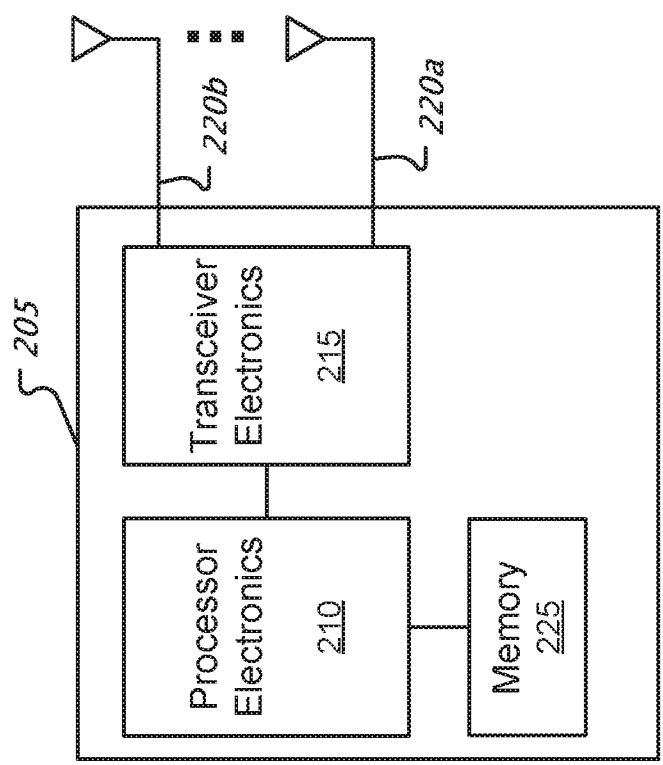
FIG. 2 shows a simplified block diagram of a wireless communication device 205.

FIG. 2 shows a simplified block diagram of a wireless communication device 205. The device 205 can include processor electronics 210 such as one or more processors that implement methods effecting the techniques presented in this disclosure. Various examples of device 205 include access point (AP), base station (BS), access terminal (AT), client station, or mobile station (MS). The device 205 can include transceiver electronics 215 to send and/or receive wireless signals over one or more antennas 220a-b. In some implementations, transceiver electronics 215 can include multiple radio units. In some implementations, a radio unit includes a baseband unit (BBU) and a radio frequency unit (RFU) to transmit and receive signals. The device 205 can include one or more memories 225 configured to store information such as data and/or instructions. In some implementations, the device 205 includes dedicated circuitry for transmitting and dedicated circuitry for receiving. The device 205 can be configured to transmit a beamforming signal, receive a beamforming signal, or both.

Figure 3:
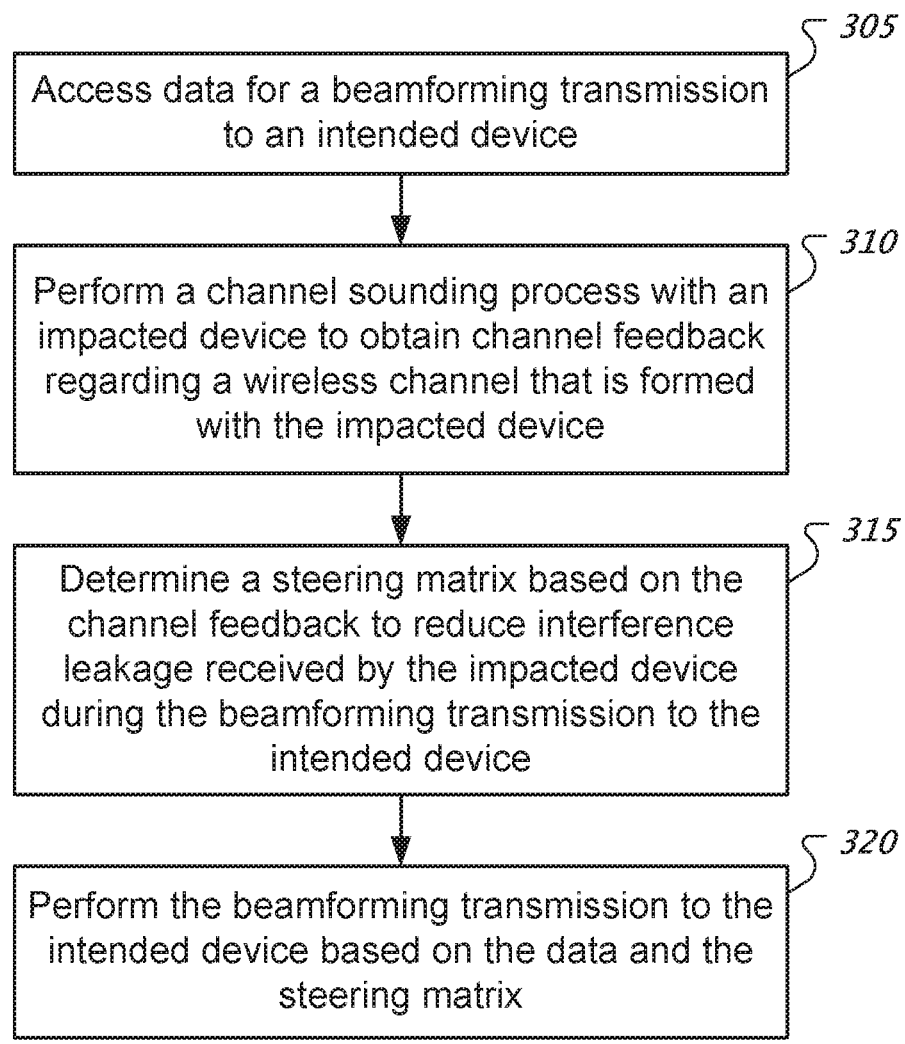
FIG. 3 shows an example of an interference avoidance beamforming transmission process.

FIG. 3 shows an example of an interference avoidance beamforming transmission process. This process can be implemented by a wireless communication device such as the device 205 depicted by FIG. 2. At 305, the process accesses data for a beamforming transmission to an intended device. Accessing data can including receive a data unit from a higher layer at a MAC layer.

At 310, the process performs a channel sounding process with an impacted device to obtain channel feedback regarding a wireless channel that is formed with the impacted device. Various examples of a channel sounding process include an explicit channel sounding process or implicit sounding process. Performing an explicit channel sounding process can include transmitting a sounding announcement packet to the impacted device, transmitting a sounding packet, and receiving channel feedback from the second device. In some implementations, the sounding announcement packet can include an interference avoidance indicator to inform the recipient that the sounding packet is for an interference avoidance determination. Performing an implicit channel sounding process can include receiving a sounding announcement packet from the impacted device, receiving a sounding packet, and determining the channel feedback based on the sounding packet.

At 315, the process determines a steering matrix based on the channel feedback to reduce interference leakage received by the impacted device during the beamforming transmission to the intended device. In some implementations, determining the steering matrix can include determining a null space of a wireless channel matrix that represents a wireless channel formed with the impacted device.

At 320, the process performs the beamforming transmission to the intended device based on the data and the steering matrix. Performing the beamforming transmission can include applying the steering matrix to an information vector that represents at least a portion of the data. In some implementations, the beamforming transmission can include data for multiple intended devices using multi-user beamforming transmission (MU-TxBF).

A sounding process can be used to determine one or more parameters such as a steering matrix for a beamforming transmission. Responsive to a sounding process, a device can obtain or perform channel estimation of a wireless channel formed between pairs of antennas on different devices to assist in transmitting data, decoding of a received signal, or both. The channel can be represented by the channel matrix H. Performing channel estimation can including computing a full-dimensional MIMO channel matrix H in each sampled subcarrier of a MIMO-OFDM system. In some implementations, a device uses channel estimation data to shape multi-antenna communications such as spatial multiplexing or beamforming. In some implementations, a device can determine one or more wireless channel matrices $H_i^k$ for respective subcarriers, e.g., OFDM tones, based on one or more received signals, where $H_i^k$. represents the channel conditions for the k-th tone associated with the i-th receiver. Note that the k-th superscript in $H_i^k$. can be dropped for clarity. Further, it can be assumed that an operation involving $H_i$ can apply to one or more channel matrices for one or more subcarriers.

A transmitter device can perform a single user beamforming transmission (SU-TxBF) to a single receiver device using a steering matrix Q that directs the signal output of two or more antennas towards the single receiver. The steering matrix Q can be a function of a channel matrix H corresponding to a channel between the transmitter and the receiver. In some implementations, a transmitter can perform a MU-TxBF to two or more receivers using steering matrices $Q_i$ that directs the signal output of multiple antennas towards the receivers, the signal output forms two or more dominant radiation lobes that coincide with the locations of the two or more receivers. Thus, a MU-TxBF can concurrently provide data to the two or more receivers via different spatial wireless channels within the same transmission frame. The transmitter can use a MU-TxBF OFDM transmission signal model based on N $$S = \sum_{i=1}^{N} Q_i x_i$$

where s is a transmitted signal vector for an OFDM tone, N is a number of simultaneously serviced receivers, $x_i$, is an information vector intended for the i-th receiver, and $Q_i$ is a steering matrix for the i-th receiver.

In a MU-TxBF model where data for multiple users are transmitted in the same packet, a received signal can include a signal component intended for the i-th receiver and one or more co-channel interference components from one or more signals intended for one or more other receivers. For example, a received signal at the i-th receiver can be expressed by:

$$Y_i = H_i Q_i x_i + H_i \sum_{k \neq i} Q_k x_k + n_i$$

where $H_i$; represents a wireless channel matrix associated with a wireless channel between a transmitter and the i-th receiver, $Q_i$ is a steering matrix for the i-th receiver, and $n_i$; represents noise at the i-th receiver. The summation term represents the co-channel interference components and the summation is performed over values of j corresponding to receivers other than the i-th receiver.

In IA-TxBF, each packet can provide data for a receiver device, which is similar to SU-TxBF. However, a goal of IA-TxBF is to cancel or minimize interference leakage to other receivers such as a receiver in a different BSS. In a IA-TxBF model, a received signal at an intended receiver in one subcarrier is represented by $Y_i = H_i Q_i x_i + n_i$; whereas the leaked interference signal at an impacted receiver in one subcarrier is represented by $Y_L = H_L Q_i x_i + n_L$, where channel matrix $H_i$; corresponds to a channel formed with the intended receiver and channel matrix $H_L$, corresponds to a channel formed with the impacted receiver.

For IA-TxBF to cancel interference leakage to an impacted receiver, a steering matrix $Q_i$; can be designed with the following constraint: $H_L Q=0$ which can be realized by determining a $Q_i$, such that $Q_i \in \text{null}(H_L)$, i.e., $Q_i$, is in a null space of the leakage channel matrix $H_L$. Due to impairments and channel variations, absolute zero, i.e., absolute cancellation, may not be possible, however, the leakage at the impacted device can be minimized.

One example of the Q design for IA-TxBF can be expressed as follows:

$$Q_i = V_{\perp H_L} V_i$$

where $V_{\perp H_L}$ a null steering matrix which "steers" to the null space of $H_L$; and $V_i$, is the steering matrix that optimizes the performance of the composite channel matrix $H_i, V_{\perp H_L}$. Note that $V_i$, is computed and used only if $H_i$; is also available, otherwise $V_i = I$ where I is the identity matrix, or alternatively, the Q design becomes $Q_i = V_{\perp H_L}$.

In some implementations, a null steering matrix $V_{\perp H_L}$ for a channel matrix HL can be computed based on $V_{\perp H_L} = I - V_{H_L} V_{H_L}^*$ where $V_{H_L}$ is the steering matrix for a channel matrix $H_L$ and $V^*_{H_L}$ is the conjugate transpose of $V_{H_L}$. In some implementations, $V_{H_L}$; is determined by computing the singular vectors of $H_L$. The singular vectors can be generated by using a singular value decomposition (SVD) technique. Note that the columns in VH forms basis vectors of the null-space of the channel matrix $H_L$. A sounding technique, such as explicit or implicit techniques as described herein, can be used to determine associated channel information, e.g., the channel matrices, the V steering matrices, or both, for IA-TxBF.

An interfering device can become aware of interference that it is causing to an impacted device in the same BSS or another BSS. Based on over hearing a strong interfering signal from the interfering device, the impacted device can initiate an explicit sounding process by sending a request such as a sounding request to the interfering device to cause the interfering device to send a sounding packet that is addressed to the impacted device. In some implementations, the sounding packet includes a null data packet (NDP) such as an NDP defined by IEEE 802.11n or 802.11ac. In some implementations, the interfering device sends before the NDP, an NDP announcement frame that includes a MAC header. The MAC header can include a destination address of the impacted device and an indicator indicating that this is for an interference avoidance sounding process.

The impacted device receives the sounding packet, and uses it to determine and send a feedback packet back to the interfering device. In some implementations, the feedback packet includes CSI feedback such as quantized channel state information from the interfering device to the impacted device, e.g., $H_L$. In some implementations, the feedback packet includes compressed V matrix feedback. In some implementations, compressed V matrix feedback includes values for angles representing two or more beamforming feedback matrices V that correspond to two or more OFDM subcarriers. In some implementations, the feedback packet includes a compressed version of the null steering matrix $V_{\perp H}$ which is based on the CSI and is an orthogonal matrix so that it can be compressed for transmission. In some implementations, V matrix feedback can be based on the basis of CSI (e.g., singular vectors of an H matrix) as is the case for SU-TxBF. In some implementations, the feedback packet includes non-compressed V matrix feedback. For example, the feedback packet includes non-compressed V matrix feedback such as a quantized steering matrix computed based on the CSI from the interfering device to the impacted device; note that the V matrix is not required to be orthogonal for the non-compressed case.

Based on the feedback, the interfering device computes IA-TxBF steering matrices. For CSI (e.g., $H_L$) feedback, the interfering device can determine a $Q_i$, for a beamforming transmission to the i-th device such that $Q_i \in \text{null} (H_L)$. For compressed or non-compressed V matrix feedback in the case that feedback is null steering data, e.g., $V_{\perp H_L}$, then the interfering device can determine a $Q_i$, directly from the feedback, e.g., $Q_i = V_{\perp H_L}$ or if $Q_i = V_{\perp H_L} V_i$; if $V_i$, has been determined via a sounding process with the i-th device. However, for compressed or non-compressed V matrix feedback in the case that feedback is based on the basis of $H_L$, e.g., $V_{H_L}$, the interfering device can derive the null steering matrix $V_{\perp H_L} = I - V_{H_L} V_{H_L}^H$ before computing $Q_i$; for a beamforming transmission to the i-th device.

There can be multiple impacted devices. In such cases, the interfering device can perform explicit sounding by sending multiple sounding packets to multiple impacted devices in the OBSS at the same time or at different times. Alternatively, the interfering device can perform implicit sounding by receiving multiple sounding packets from multiple impacted devices. The interfering device can jointly compute a steering matrix for IA-TxBF based on channel feedback from the multiple impacted devices. For example, the interfering device can jointly compute a null-steering to the composite channel matrix to the impacted devices by determining $Q_i$; for a beamforming transmission to the i-th device such that $Q_i \in \text{null} (H_{L1}, H_{L2}, \ldots )$, where $H_{L1}, H_{L2}, \ldots$ are respective channel matrices for channels between the interfering device and the impacted devices.

Figure 4:
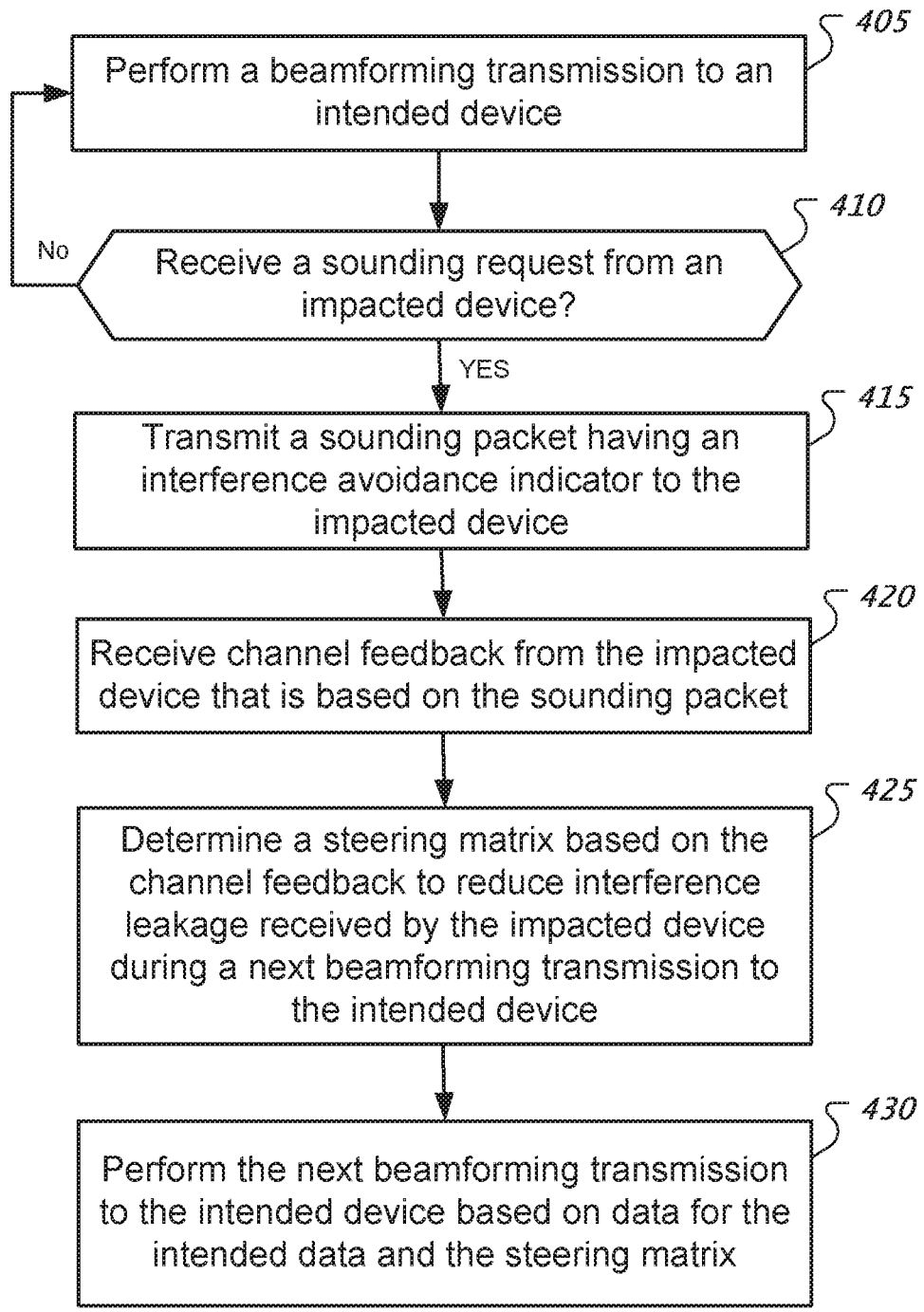
FIG. 4 shows an example of an interference avoidance beamforming transmission process that uses explicit sounding.

FIG. 4 shows an example of an interference avoidance beamforming transmission process that uses explicit sounding. This process can be implemented by a transmitter. At 405, the process performs a beamforming transmission to an intended device. Performing the beamforming transmission can include transmitting one or more steered frames to the intended device. At 410, the process determines whether a sounding request from an impacted device has been received. In some implementations, an impacted device can send a sounding request containing an interference avoidance indicator if the interference from the beamforming transmission exceeds a predetermined threshold. If a sounding request has not been received, then the process continues to perform the beamforming transmission to the intended device at 405. If a sounding request has been received, the process, at 415, transmits a sounding packet having an interference avoidance indicator to the impacted device. In some implementations, the sounding packet is announced by a sounding announcement packet that has the interference avoidance indicator.

At 420, the process receives channel feedback from the impacted device that is based on the sounding packet. In some implementations, receiving channel feedback can include receiving a packet containing a beamforming feedback matrix, e.g., $V_{H_L}$. The beamforming feedback matrix can be compressed. In some implementations, receiving channel feedback can include receiving a packet containing information that is indicative of a channel matrix. In some implementations, if the impacted device knows that this sounding is for interference avoidance, the impacted device can transmit channel feedback containing a null space beamforming feedback matrix, e.g., $V_{\perp H_L}$.

At 425, the process determines a steering matrix based on the channel feedback to reduce interference leakage received by the impacted device during a next beamforming transmission to the intended device. In some implementations, determining the steering matrix can include determining a null steering matrix responsive to the channel feedback. The null steering matrix can be based on a null space of a wireless channel matrix associated with a wireless channel that is formed with the impacted device. At 430, the process performs the next beamforming transmission to the intended device based on data for the intended data and the steering matrix.

Figure 5:
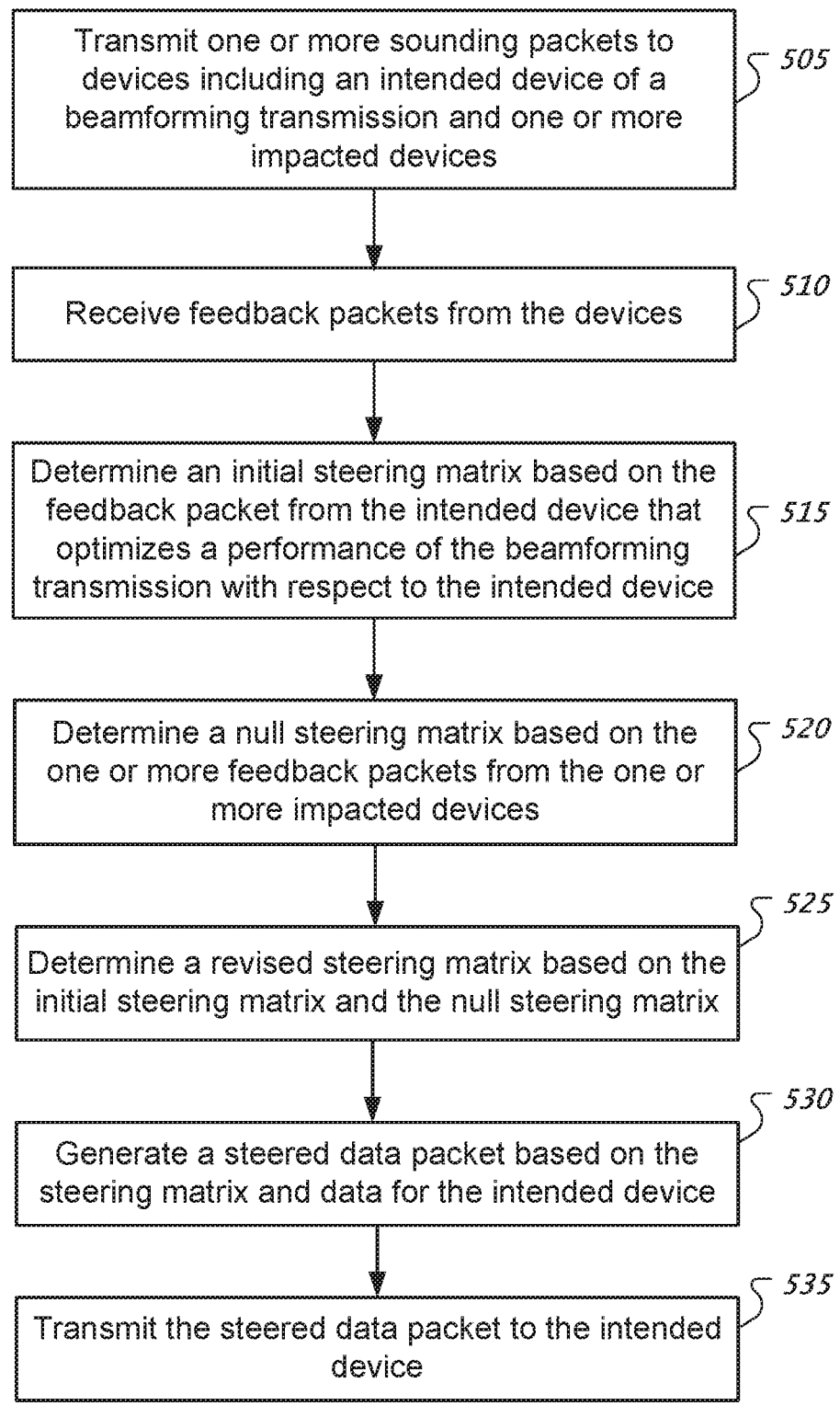
FIG. 5 shows an example of an interference avoidance beamforming transmission process that uses explicit sounding for intended and impacted devices.

FIG. 5 shows an example of an interference avoidance beamforming transmission process that uses explicit sounding for intended and impacted devices. At 505, the process transmits one or more sounding packets to devices including an intended device of a beamforming transmission and one or more impacted devices. A sounding packet can include signals based on pre-defined reference signals. A sounding packet can include two or more segments for sounding two or more different antennas.

At 510, the process receives feedback packets from the devices. A feedback packet can include information that is derived from a wireless channel estimation that is based on a received sounding packet. In some implementations, a feedback packet includes channel state information (CSI). In some implementations, CSI includes two or more signal-to-noise ratio values for two or more antennas being sounded by the sounding packet. In some implementations, a feedback packet includes beamforming feedback information such as a beamforming feedback matrix. In some implementations, a feedback packet includes interference feedback information such as an interference feedback matrix. Values that constitute a matrix can be compressed for transmission.

At 515, the process determines an initial steering matrix based on the feedback packet from the intended device that optimizes a performance of the beamforming transmission with respect to the intended device. Determining an initial steering matrix can include deriving a wireless channel matrix H based on CSI values in a feedback packet from the intended device. Determining an initial steering matrix can include uncompressing a matrix V from compressed beamforming feedback matrix data in a feedback packet from the intended device.

At 520, the process determines a null steering matrix based on the one or more feedback packets from the one or more impacted devices. At 525, the process determines a revised steering matrix based on the initial steering matrix and the null steering matrix. At 530, the process generates a steered data packet based on the steering matrix and data for the intended device. At 535, the process transmits the steered data packet to the intended device.

Figure 6:
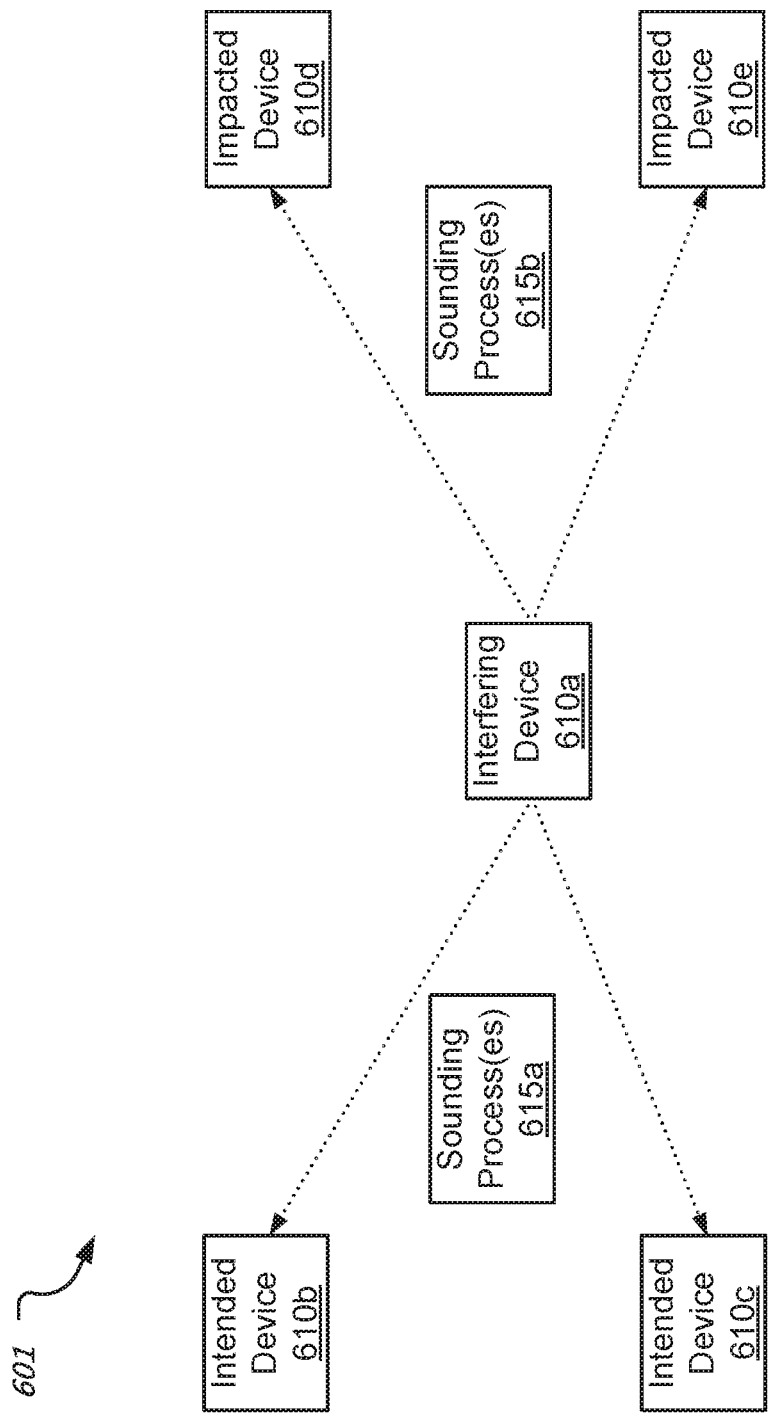
FIG. 6 shows an example of sounding processes associated with an interference avoidance beamforming transmission.

FIG. 6 shows an example of sounding processes associated with an interference avoidance beamforming transmission. Devices 610a-e can communicate via one or more wireless channels within an operating environment 601. The interfering device 610a can perform one or more sounding processes 615a with one or more intended devices 610b-c. Results of the one or more sounding processes 615a can be used for SU-TxBF or MU-TxBF. Further, the interfering device 610a can perform one or more sounding processes 615b with one or more one or more impacted devices 610d-e. Results of the one or more sounding processes 615b can be used for interference avoidance versions of SU-TxBF or MU-TxBF. In some implementations, the interfering device 610a can perform both of the sounding processes 615a-b concurrently. In some implementations, the interfering device 610a only performs the one or more sounding processes 615b for interference avoidance if triggered by an interference avoidance request from an impacted device 610d-e. In some implementations, two or more types of soundings (e.g., explicit or implicit) can be used for the sounding processes 615a-b. For example, sounding process 615a can be explicit, while sounding process 615b can be implicit.

Figure 7:
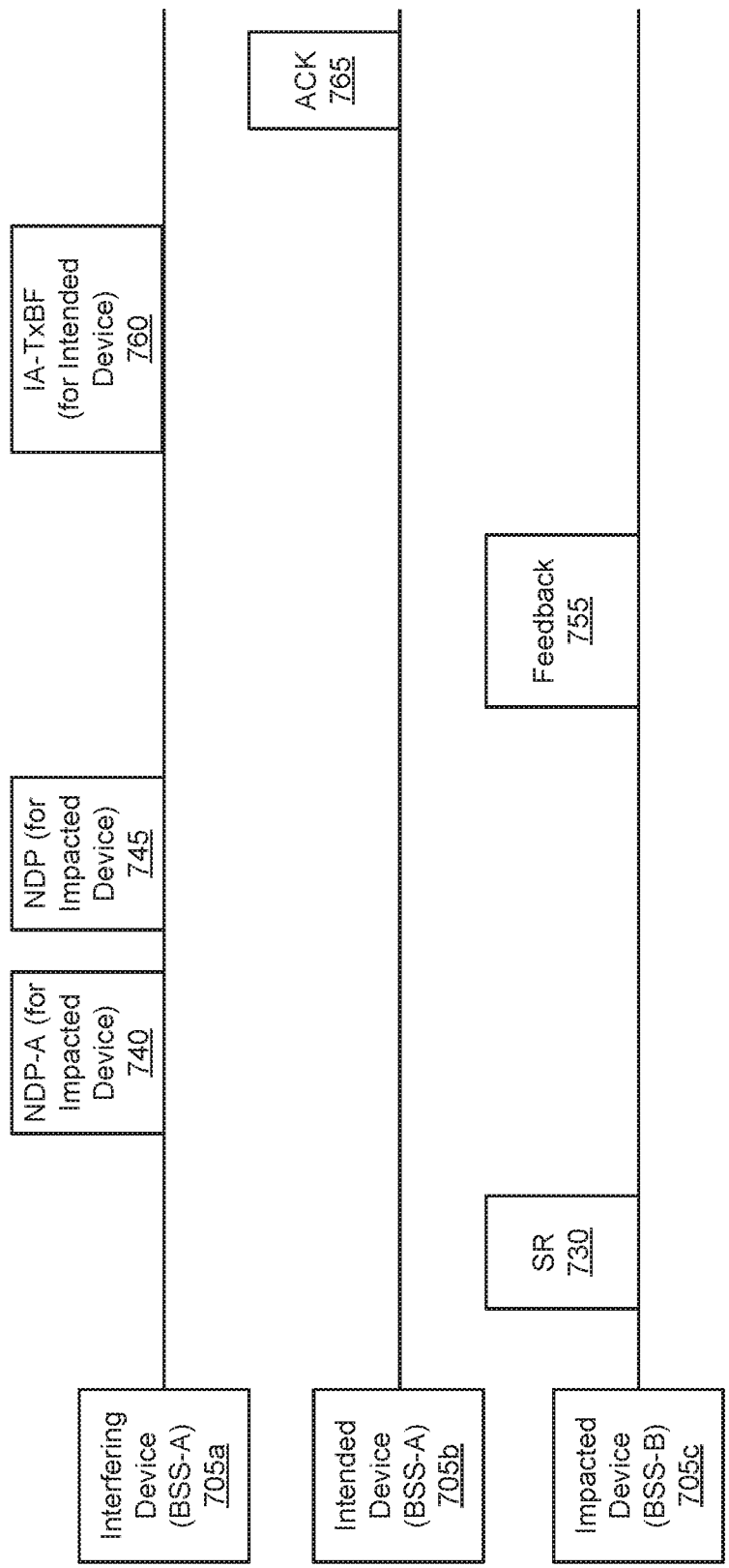
FIG. 7 shows an example of a wireless communication sequence that includes an explicit sounding sequence for an interference avoidance beamforming transmission.

FIG. 7 shows an example of a wireless communication sequence that includes an explicit sounding sequence for an interference avoidance beamforming transmission. Devices 705a-c, which include an interfering device 705a, intended device 705b, and impacted device 705c, can communicate via a wireless channel. Interfering device 705a and intended device 705b are associated with BSS-A, while impacted device 705c is associated with BSS-B. In this example, impacted device 705c may detect interference, e.g., signals, from interfering device 705a and decide to transmit a sounding request 730. In response to receiving the sounding request 730, interfering device 705a can transmit a sounding announcement packet such as an NDP Announcement (NDP-A) 740 to indicate that a sounding packet such as an NDP will be transmitted. The NDP-A 740 can include an indicator conveying that it is for an interference avoidance sounding process. The NDP-A 740 can include a destination address field having a network address associated with impacted device 705c.

After transmission of the NDP-A 740, interfering device 705a can transmit the corresponding NDP 745. Impacted device 705c can receive the NDP-A 740 and the NDP 745, and based at least on the latter, determine information about a wireless channel between itself and interfering device 705a. Impacted device 705c can generate a feedback packet 755 based on the wireless channel information and transmit the feedback packet 755 to interfering device 705a. In some implementations, the feedback packet 755 can include CSI. In some implementations, the feedback packet 755 can include a compressed or a non-compressed steering matrix. In some implementations, the feedback packet 755 can include compressed V matrix feedback, or a non-compressed V matrix feedback. In some implementations, the feedback packet 755 can include a compressed or a non-compressed null steering matrix.

Interfering device 705a can use the feedback packet 755 to determine a steering matrix for an interference avoidance beamforming transmission 760 to intended device 705b that minimizes signal transmission towards impacted device 705c. In some implementations, based on a successful reception of the beamforming transmission 760, intended device 705b can send an ACK 765.

Figure 8:
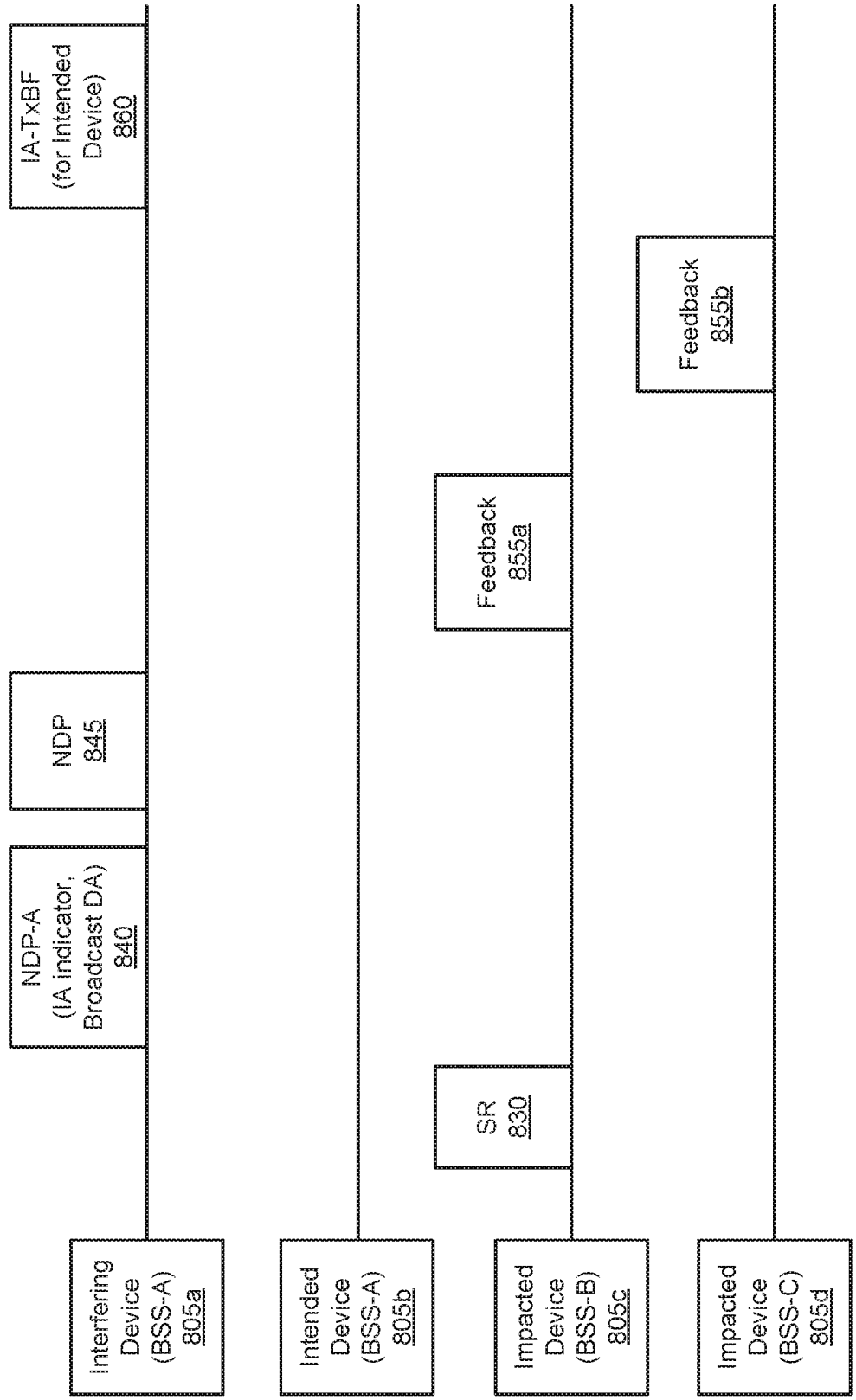
FIG. 8 shows an example of a wireless communication sequence that includes an explicit sounding sequence with multiple impacted devices for an interference avoidance beamforming transmission.

FIG. 8 shows an example of a wireless communication sequence that includes an explicit sounding sequence with multiple impacted devices for an interference avoidance beamforming transmission. Devices 805a-d, which include interfering device 805a, intended device 805b, impacted device A 805c, and impacted device B 805d, can communicate via a wireless channel. Interfering device 805a and intended device 805b are associated with BSS-A, while impacted device A 805c is associated with BSS-B and impacted device B 805c is associated with BSS-C. In some implementations, impacted device A 805c may detect interference, e.g., signals, from interfering device 805a and decide to transmit a sounding request 830 to inform the interfering device 805a about the interference.

Interfering device 805a can transmit an NDP-A 840 to indicate that an NDP 845 will be transmitted. The NDP-A 840 can include an indicator, such as one or more bits in a header field, conveying that it is for an interference avoidance sounding process. Further, the NDP-A 840 can include a destination address field having a broadcast address. By using a broadcast address, the interfering device 805a can determine whether there are other impacted devices. In some implementations, the NDP-A 840 is sent in response to receiving the sounding request 830. In some implementations, the interfering device 805a periodically sends the NDP-A 840 without receiving a sounding request 830 to proactively minimize interference to one or more devices.

After transmission of the NDP-A 840, interfering device 805a can transmit the corresponding NDP 845. Impacted devices 805c-d can receive the NDP-A 840 and the NDP 845, and based at least on the latter, determine information about wireless channels between themselves and interfering device 805a. Impacted devices 805c-d can generate feedback packets 855a-b based on the determined wireless channel information and transmit the feedback packets 855a-b to interfering device 805a. The impacted devices 805c-d can separately wait a randomized delay interval before sending their respective feedback packets 855a-b to minimize the chance of collision. In some implementations, the feedback packets 855a-b can include CSI such as one or more Signal to Noise Ratio (SNR) values for one or more transmission antennas being sounded by the NDP 845. In some implementations, the feedback packets 855a-b can include a compressed or a non-compressed steering matrix. In some implementations, the feedback packets 855a-b can include compressed V matrix feedback, or a non-compress V matrix feedback. In some implementations, the feedback packets 855a-b can include a compressed or a non-compressed null steering matrix.

Interfering device 805a can use the feedback packets 855a-b to determine a steering matrix for an interference avoidance beamforming transmission 860 to intended device 805b that minimizes signal transmission towards one or more of the impacted devices 805c-d. In some implementations, interfering device 805a can select an impacted device from a group of impacted devices 805c-d experiencing the strongest interference, and compute a steering matrix for the interference avoidance beamforming transmission 860 based on the feedback packet from the selected impacted device. In some implementations, the selection of the impacted device is determined by comparing SNR values in channel feedback packets. In some implementations, interfering device 805a can compute a steering matrix for the interference avoidance beamforming transmission 860 based on a joint null space calculation, e.g., $Q_i \in$null$(H_{L1}, H_{L2}, \ldots )$.

Figure 9:
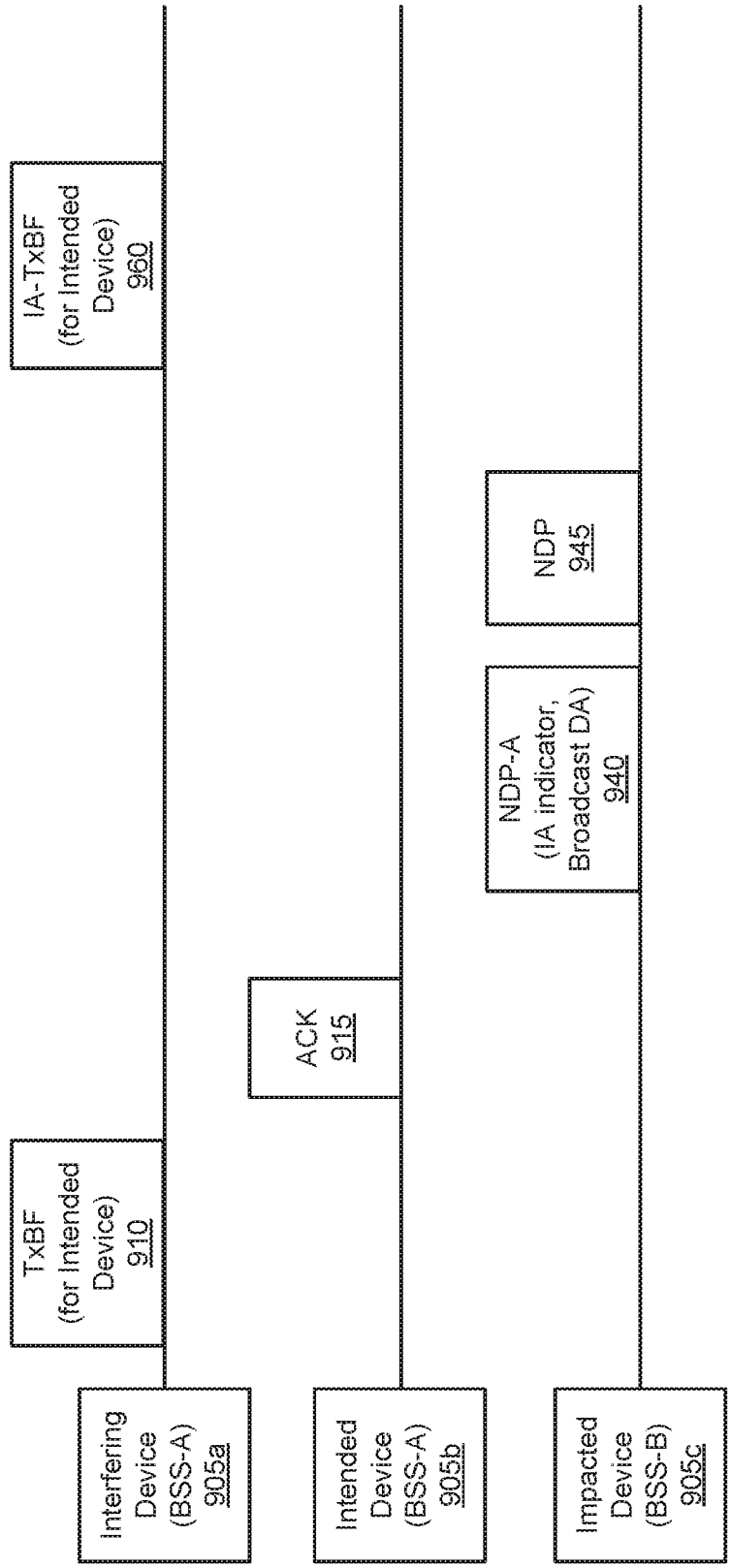
FIG. 9 shows an example of a wireless communication sequence that includes an implicit sounding sequence for an interference avoidance beamforming transmission.

FIG. 9 shows an example of a wireless communication sequence that includes an implicit sounding sequence for an interference avoidance beamforming transmission. Devices 905a-c, which include an interfering device 905a, intended device 905b, and impacted device 905c, can communicate via a wireless channel. Interfering device 905a and intended device 905b are associated with BSS-A, while impacted device 905c is associated with BSS-B. Interfering device 905a performs a nominal beamforming transmission 910 to the intended device 905b. In some implementations, based on a successful reception of the beamforming transmission 910, intended device 905b can send an ACK 915. In this example, impacted device 905c may detect interference, e.g., signals associated with the nominal beamforming transmission 910, from interfering device 905a and decide to start an interference avoidance sounding process by sending an NDP-A 940 to indicate that an NDP 945 will be transmitted. The NDP-A 940 can include an indicator conveying that it is for an interference avoidance sounding process. Further, the NDP-A 940 can include a destination address field having a broadcast address. After transmission of the NDP-A 940, impacted device 905c can transmit the corresponding NDP 945.

Interfering device 905a can receive the NDP 945 and use it to determine a channel matrix $H_{implicit}$ for a wireless channel between itself and interfering device 905a. The interfering device 905a can compute a transpose of $H_{implicit}$ to determine $H_L$, $V_{\perp H_L}$ and $Q_i$. Interfering device 905a can use $Q_i$, for an interference avoidance beamforming transmission 960 to intended device 905b that minimizes signal transmission towards impacted device 905c.

In some implementations, the interfering device 905a can receive sounding packets from multiple impacted devices. In some implementations, based on comparing interference information extracted from the sounding packets, the interfering device 905a can select an impacted device that experiences the most interference from the interfering device 905a. In some implementations, the interfering device 905a can compute a joint steering matrix based on null spaces of leakage channel matrices indicated by two or more sounding packets from two or more impacted devices.

In some implementations, a technique for interference avoidance beamforming transmissions can include accessing, at a first device, data for transmission to a second device; performing, at the first device, a channel sounding process with a third device to obtain channel feedback regarding a wireless channel between the first device and the third device; determining a steering matrix based on the channel feedback to reduce interference leakage received by the third device during a beamforming transmission from the first device to the second device; and performing, at the first device, the beamforming transmission to the second device based on the data and the steering matrix. Other implementations are directed to systems, devices and computer-readable, storage mediums.

These and other implementations can include one or more of the following features. In some implementations, determining the steering matrix can include determining a null steering matrix responsive to the channel feedback, the null steering matrix being based on a null space of a wireless channel matrix associated with the wireless channel. In some implementations, determining the steering matrix can include determining a first matrix responsive to the channel feedback, the first matrix being based on a null space of a wireless channel matrix associated with the wireless channel; and determining a second matrix to improve a performance of the beamforming transmission with respect to the second device, the steering matrix being based on the first matrix and the second matrix. In some implementations, the channel sounding process can include transmitting a sounding announcement packet to the third device, the sounding announcement packet can include an interference avoidance indicator; transmitting a sounding packet after transmitting the sounding announcement packet; and receiving the channel feedback from the third device, the channel feedback being based on the sounding packet. In some implementations, the steering matrix is based on a null space of a wireless channel matrix that represents channel state information, the channel state information being included in the channel feedback. In some implementations, determining the steering matrix can include determining a null steering matrix based on steering matrix feedback such that columns in the null steering matrix form basis vectors in a null-space of a wireless channel matrix associated with the third device, the steering matrix feedback being included in the channel feedback. In some implementations, the channel sounding process can include receiving, at the first device, a sounding announcement packet from the third device, the sounding announcement packet can include an interference avoidance indicator; receiving, at the first device, a sounding packet from the third device after receiving the sounding announcement packet; and determining, at the first device, the channel feedback based on the sounding packet. In some implementations, the second device and the third device are associated with different basic service sets, the basic service sets overlapping in a frequency band.

An apparatus can include first circuitry configured to access data for transmission to a first device; and second circuitry configured to control a channel sounding process with a second device to obtain channel feedback regarding a wireless channel between the apparatus and the second device, determine a steering matrix based on the channel feedback to reduce interference leakage received by the second device during a beamforming transmission from the apparatus to the first device, and control the beamforming transmission to the first device based on the data and the steering matrix. In some implementations, the steering matrix is based on a null steering matrix. In some implementations, the second circuitry is configured to determine the null steering matrix responsive to the channel feedback, the null steering matrix being based on a null space of a wireless channel matrix associated with the wireless channel. In some implementations, the second circuitry is configured to determine a first matrix responsive to the channel feedback, the first matrix being based on a null space of a wireless channel matrix associated with the wireless channel, and determine a second matrix to improve a performance of the beamforming transmission with respect to the first device, the steering matrix being based on the first matrix and the second matrix. In some implementations, the channel sounding process can include transmitting a sounding announcement packet to the second device, the sounding announcement packet can include an interference avoidance indicator; transmitting a sounding packet after transmitting the sounding announcement packet; and receiving the channel feedback from the second device, the channel feedback being based on the sounding packet. In some implementations, wherein the steering matrix is based on a null space of a wireless channel matrix that represents channel state information, the channel state information being included in the channel feedback. In some implementations, the second circuitry is configured to determine the null steering matrix based on steering matrix feedback such that columns in the null steering matrix form basis vectors in a null-space of a wireless channel matrix associated with the second device, the steering matrix feedback being included in the channel feedback. In some implementations, the channel sounding process can include receiving a sounding announcement packet from the second device, the sounding announcement packet can include an interference avoidance indicator; receiving a sounding packet from the second device after receiving the sounding announcement packet; and determining the channel feedback based on the sounding packet. In some implementations, wherein the first device and the second device are associated with different basic service sets, the basic service sets overlapping in a frequency band.

A system can include transceiver electronics configured to wirelessly communicate with devices including a first device and a second device; and processor electronics coupled with the transceiver electronics. The processor electronics can be configured to access data for transmission to the first device, control a channel sounding process with the second device to obtain channel feedback regarding a wireless channel between the system and the second device, determine a steering matrix based on the channel feedback to reduce interference leakage received by the second device during a beamforming transmission from the system to the first device, and control the beamforming transmission to the first device based on the data and the steering matrix. In some implementations, the steering matrix is based on a null steering matrix, and wherein the processor electronics are configured to determine the null steering matrix responsive to the channel feedback, the null steering matrix being based on a null space of a wireless channel matrix associated with the wireless channel. In some implementations, the processor electronics are configured to determine a first matrix responsive to the channel feedback, the first matrix being based on a null space of a wireless channel matrix associated with the wireless channel, and determine a second matrix to improve a performance of the beamforming transmission with respect to the first device, the steering matrix being based on the first matrix and the second matrix. In some implementations, the channel sounding process can include transmitting a sounding announcement packet to the second device, the sounding announcement packet can include an interference avoidance indicator; transmitting a sounding packet after transmitting the sounding announcement packet; and receiving the channel feedback from the second device, the channel feedback being based on the sounding packet. In some implementations, the steering matrix is based on a null space of a wireless channel matrix that represents channel state information, the channel state information being included in the channel feedback. In some implementations, the processor electronics are configured to determine the null steering matrix based on steering matrix feedback such that columns in the null steering matrix form basis vectors in a null-space of a wireless channel matrix associated with the second device, the steering matrix feedback being included in the channel feedback. In some implementations, the channel sounding process can include receiving a sounding announcement packet from the second device, the sounding announcement packet can include an interference avoidance indicator; receiving a sounding packet from the second device after receiving the sounding announcement packet; and determining the channel feedback based on the sounding packet. In some implementations, the first device and the second device are associated with different basic service sets, the basic service sets overlapping in a frequency band.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A first wireless communication device, comprising:
transceiver circuitry configured to (i) access data corresponding to a beamforming transmission, (ii) transmit, from the first wireless communication device to at least one second wireless communication device, a first sounding packet, and (iii) receive, from the at least one second wireless communication device, at least one second sounding packet in response to the transmission of the first sounding packet, wherein the second sounding packet includes channel feedback determined at the at least one second wireless communication device; and
processor circuitry configured to determine a steering matrix based on the channel feedback included in the second sounding packet, wherein the steering matrix is configured to at least one of reduce and avoid interference caused at the at least one second wireless communication device by transmissions from the first wireless communication device to at least one third wireless communication device, wherein the at least one third wireless communication device is an intended device for the transmissions from the first wireless communication device and the at least one second wireless communication device is not the intended device for the transmissions from the first wireless communication device, wherein the first wireless communication device and the at least one third wireless communication device are associated with a first basic service set and the second wireless communication device is associated with a second basic service set, and wherein the transceiver circuitry is further configured to perform the beamforming transmission to the at least one third wireless communication device in accordance with (i) the data corresponding to the beamforming transmission and (ii) the steering matrix.

2. The first wireless communication device of claim 1, wherein the channel feedback corresponds to a channel formed between the first wireless communication device and the at least one second wireless communication device.

3. The first wireless communication device of claim 2, wherein the channel feedback includes channel state information.

4. The first wireless communication device of claim 1, wherein the transceiver circuitry is further configured to transmit a first sounding announcement packet to the at least one second wireless communication device prior to transmitting the first sounding packet, and wherein the first sounding announcement packet includes an indicator that the first sounding packet corresponds to an interference avoidance determination.

5. The first wireless communication device of claim 1, wherein, to determine the steering matrix, the processor circuitry is further configured to determine a null space of a wireless channel matrix corresponding to a channel formed between the first wireless communication device and the at least one second wireless communication device.

6. The first wireless communication device of claim 5, wherein the steering matrix corresponds to a null steering matrix.

7. The first wireless communication device of claim 6, wherein columns in the null steering matrix form basis vectors in the null space of the wireless channel matrix.

8. The first wireless communication device of claim 1, wherein, to perform the beamforming transmission, the transceiver circuitry is further configured to apply the steering matrix to an information vector corresponding to at least a portion of the data corresponding to the beamforming transmission.

9. The first wireless communication device of claim 1, wherein (i) the beamforming transmission includes beamforming data for multiple devices and (ii) the at least one third wireless communication device includes a plurality of the third wireless communication devices.

10. A method for operating a first wireless communication device, the method comprising:
  accessing data corresponding to a beamforming transmission;
  transmitting, from the first wireless communication device to at least one second wireless communication device, a first sounding packet;
  receiving, from the at least one second wireless communication device, at least one second sounding packet in response to the transmission of the first sounding packet, wherein the second sounding packet includes channel feedback determined at the at least one second wireless communication device;
  determining a steering matrix based on the channel feedback included in the second sounding packet, wherein the steering matrix is configured to at least one of reduce and avoid interference caused at the at least one second wireless communication device by transmissions from the first wireless communication device to at least one third wireless communication device, wherein the at least one third wireless communication device is an intended device for the transmissions from the first wireless communication device and the at least one second wireless communication device is not the intended device for the transmissions from the first wireless communication device,
  wherein the first wireless communication device and the at least one third wireless communication device are associated with a first basic service set and the second wireless communication device is associated with a second basic service set,
  performing the beamforming transmission to the at least one third wireless communication device in accordance with (i) the data corresponding to the beamforming transmission and (ii) the steering matrix.

11. The method of claim 10, wherein the channel feedback corresponds to a channel formed between the first wireless communication device and the at least one second wireless communication device.

12. The method of claim 11, wherein the channel feedback includes channel state information.

13. The method of claim 10, further comprising transmitting a first sounding announcement packet to the at least one second wireless communication device prior to transmitting the first sounding packet, wherein the first sounding announcement packet includes an indicator that the first sounding packet corresponds to an interference avoidance determination.

14. The method of claim 10, wherein determining the steering matrix includes determining a null space of a wireless channel matrix corresponding to a channel formed between the first wireless communication device and the at least one second wireless communication device.

15. The method of claim 14, wherein the steering matrix corresponds to a null steering matrix.

16. The method of claim 15, wherein columns in the null steering matrix form basis vectors in the null space of the wireless channel matrix.

17. The method of claim 10, wherein performing the beamforming transmission includes applying the steering matrix to an information vector corresponding to at least a portion of the data corresponding to the beamforming transmission.

18. The method of claim 10, wherein (i) the beamforming transmission includes beamforming data for multiple devices and (ii) the at least one third wireless communication device includes a plurality of the third wireless communication devices.

* * * * *